US012615418B2

(12) United States Patent
Hu et al.

(10) Patent No.: US 12,615,418 B2
(45) Date of Patent: Apr. 28, 2026

(54) VIDEO VIEWING METHOD AND APPARATUS

(71) Applicant: SHANGHAI BILIBILI TECHNOLOGY CO., LTD., Shanghai (CN)

(72) Inventors: Boya Hu, Shanghai (CN); Xiaoshan Lin, Shanghai (CN); Ying Zhuang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 168 days.

(21) Appl. No.: 18/290,697

(22) PCT Filed: Jun. 21, 2022

(86) PCT No.: PCT/CN2022/100039
§ 371 (c)(1),
(2) Date: Jan. 19, 2024

(87) PCT Pub. No.: WO2023/000896
PCT Pub. Date: Jan. 26, 2023

(65) Prior Publication Data
US 2025/0097535 A1    Mar. 20, 2025

(30) Foreign Application Priority Data
Jul. 20, 2021    (CN) ......................... 202110821409.X

(51) Int. Cl.
*H04N 21/40*        (2011.01)
*H04N 21/442*       (2011.01)
*H04N 21/472*       (2011.01)

(52) U.S. Cl.
CPC . *H04N 21/47217* (2013.01); *H04N 21/44213* (2013.01)

(58) Field of Classification Search
CPC ....... H04N 21/47217; H04N 21/44213; H04N 21/4316; H04N 21/4788; H04N 21/4882; H04N 21/25891
See application file for complete search history.

(56) References Cited

U.S. PATENT DOCUMENTS 9,805,207 B1    10/2017  Nijim et al.
10,433,009 B2 * 10/2019  Wittke ............... H04N 21/4334
(Continued)

FOREIGN PATENT DOCUMENTS

CN        101075891 A      11/2007
CN        104954879 A       9/2015
(Continued)

OTHER PUBLICATIONS

CN110719515A English translation, Lei, Beijing Youku Tech Co Ltd, Jan. 21, 2020, pp. 1-26 (Year: 2020).*
(Continued)

*Primary Examiner* — Laurie A Ries
(74) *Attorney, Agent, or Firm* — BakerHostetler

(57) ABSTRACT

This application provides a method and apparatus for view videos. The method includes determining a viewing progress of viewing a target video by a user, determining a target projection room associated with the target video based on the viewing progress; and sending the user a video viewing invitation to access the target projection room. This implements that a projection room with a similar progress is matched for the user, so that the user can view a video with another user together.

20 Claims, 6 Drawing Sheets

(56) References Cited

U.S. PATENT DOCUMENTS

| | | | | |
|---|---|---|---|---|
| 11,849,165 B2 * | 12/2023 | Shanson | ............ | H04N 21/2407 |
| 12,368,924 B2 * | 7/2025 | Saito | ...................... | G11B 27/34 |
| 2007/0157237 A1 * | 7/2007 | Cordray | ................ | H04N 21/47 |
| | | | | 725/89 |
| 2013/0198298 A1 * | 8/2013 | Li | .................... | H04N 21/64322 |
| | | | | 709/206 |
| 2015/0350746 A1 * | 12/2015 | Tomita | ............... | H04N 21/4436 |
| | | | | 725/34 |
| 2016/0323650 A1 * | 11/2016 | Grouf | ................ | H04N 21/4668 |
| 2016/0330501 A1 * | 11/2016 | Tomita | ............... | H04N 21/4524 |
| 2018/0352303 A1 | 12/2018 | Siddique et al. | | |
| 2021/0136447 A1 * | 5/2021 | Daw | ................ | H04N 21/47217 |
| 2022/0385701 A1 * | 12/2022 | Wang | .................... | H04L 67/104 |
| 2023/0291971 A1 * | 9/2023 | Kan | .................. | H04M 1/72409 |
| 2024/0314378 A1 * | 9/2024 | Hou | ................... | H04N 21/2668 |

FOREIGN PATENT DOCUMENTS

| | | | | | |
|---|---|---|---|---|---|
| CN | 107333146 A | | 11/2017 | | |
| CN | 110719515 A | * | 1/2020 | ........... | H04N 21/442 |
| CN | 110752983 A | | 2/2020 | | |
| CN | 111277884 A | | 6/2020 | | |
| CN | 111541945 A | * | 8/2020 | ........... | H04N 21/472 |
| CN | 112104904 A | | 12/2020 | | |
| CN | 112399225 A | * | 2/2021 | ........... | H04N 21/262 |
| CN | 113556611 A | | 10/2021 | | |

OTHER PUBLICATIONS

International Patent Application No. PCT/CN2022/100039; Int'l Search Report; dated Sep. 9, 2022; 3 pages.

* cited by examiner

Determine a viewing progress of viewing a target video by a user                    102

Determine a target projection room associated with the target video based on the viewing progress                    104

Send the user a video viewing invitation to access the target projection room                    106

Meet a class A condition: there is currently a projection room with consistent initial playing Meet a class A condition: there is currently a projection room with a consistent progress Meet a class B condition: there is a projection room of a current season/episode

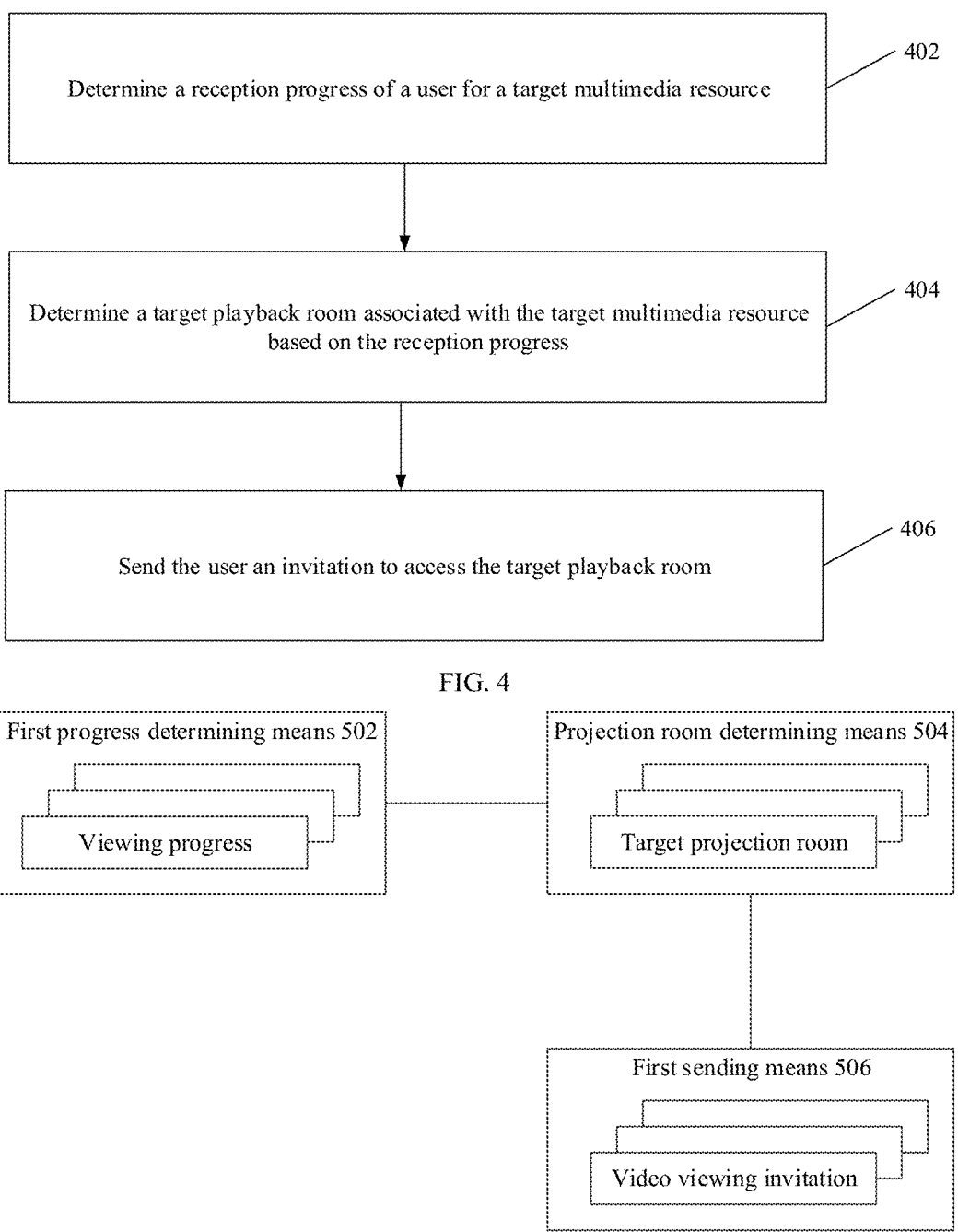

Determine a reception progress of a user for a target multimedia resource — 402

Determine a target playback room associated with the target multimedia resource based on the reception progress — 404

Send the user an invitation to access the target playback room — 406

FIG. 4

First progress determining means 502

Viewing progress

Projection room determining means 504

Target projection room

First sending means 506

Video viewing invitation

FIG. 5

VIDEO VIEWING METHOD AND APPARATUS

CROSS-REFERENCE TO RELATED APPLICATIONS

This application is the U.S. National Stage of International Application No. PCT/CN2022/100039, filed on Jun. 21, 2022, which claims priority to Chinese Patent Application No. 202110821409.X, filed on Jul. 20, 2021, and entitled "VIDEO VIEWING METHOD AND APPARATUS", both of which are incorporated herein by reference in their entireties.

TECHNICAL FIELD

This application relates to the field of video processing technologies, and in particular, to a video viewing method. This application also relates to a video viewing apparatus, a resource receiving method, a resource receiving apparatus, a computing device, a computer-readable storage medium, and a computer program.

BACKGROUND

Currently, a user usually views a video on each video detail page. Although the video detail page displays information such as popularity of the video, and a rating and a comment on the video, the data is not fully connected to the user for effective use. In this case, the user can only know that many persons are currently viewing this video, but cannot reach users behind these screens, making it impossible to view the video together in a true sense.

SUMMARY

In view of this, embodiments of this application provide a video viewing method. This application also relates to a video viewing apparatus, a resource receiving method, a resource receiving apparatus, a computing device, a computer-readable storage medium, and a computer program, to resolve a technical defect in the conventional technology of relatively low interactivity when a same video is viewed.

According to a first aspect of the embodiments of this application, a video viewing method is provided and includes:

determining a viewing progress of viewing a target video by a user;

determining a target projection room associated with the target video based on the viewing progress; and sending the user a video viewing invitation to access the target projection room.

According to a second aspect of the embodiments of this application, a resource receiving method is provided and includes:

determining a reception progress of a user for a target multimedia resource;

determining a target playback room associated with the target multimedia resource based on the reception progress; and sending the user a resource reception invitation to access the target playback room.

According to a third aspect of the embodiments of this application, a video viewing apparatus is provided and includes:

a first progress determining means, configured to determine a viewing progress of viewing a target video by a user;

a projection room determining means, configured to determine a target projection room associated with the target video based on the viewing progress; and a first sending means, configured to send the user a video viewing invitation to access the target projection room.

According to a fourth aspect of the embodiments of this application, a resource receiving apparatus is provided and includes:

a second progress determining means, configured to determine a reception progress of a user for a target multimedia resource;

a playback room determining means, configured to determine a target playback room associated with the target multimedia resource based on the reception progress; and a second sending means, configured to send the user a resource reception invitation to access the target playback room.

According to a fifth aspect of the embodiments of this application, a computing device is provided, including a memory, a processor, and computer instructions stored in the memory and capable of being run on the processor, and the processor executes the computer instructions to implement the steps of the video viewing method or the resource receiving method.

According to a sixth aspect of the embodiments of this application, a computer-readable storage medium is provided, storing computer instructions, and the computer instructions are executed by a processor to implement the steps of the video viewing method or the resource receiving method.

According to a seventh aspect of the embodiments of this application, a computer program is provided, and when the computer program is executed on a computer, the computer is enabled to perform the steps of the data viewing method or the resource receiving method.

According to the video viewing method provided in this application, the viewing progress of viewing the target video by the user is determined; on the basis of determining the viewing progress, the target projection room associated with the target video is determined based on the viewing progress; and the video viewing invitation to access the target projection room is sent to the user. This implements that a projection room with a similar progress is matched for the user based on the viewing progress of the user, so that the user can access the projection room to view the video together with another user, and the user establishes a social relationship with the another user in a same projection room, thereby improving viewing fun of the user.

BRIEF DESCRIPTION OF DRAWINGS

FIG. 4 is a flowchart of a resource receiving method according to an embodiment of this application;

FIG. 5 is a schematic diagram of a structure of a video viewing apparatus according to an embodiment of this application;

DESCRIPTION OF EMBODIMENTS

Many specific details are described in the following description to facilitate full understanding of this application. However, this application can be implemented in many other manners different from those described herein, and a person skilled in the art can make similar promotion without departing from the connotation of this application. Therefore, this application is not limited by specific implementations disclosed below.

Terms used in one or more embodiments of this application are merely for the purpose of describing a specific embodiment, and are not intended to limit the one or more embodiments of this application. The terms "a", "the", and "said" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" can be used in one or more embodiments of this application to describe various types of information, the information is not limited to these terms. These terms are only used to distinguish between information of the same type. For example, without departing from the scope of one or more embodiments of this application, "first" may also be referred to as "second", and similarly, "second" may also be referred to as "first". Depending on the context, for example, the word "if" used herein can be interpreted as "while", "when", or "in response to determining".

Terms used in one or more embodiments of this application are explained first.

Projection room: is an organizational scenario of a viewing together function. Usually, there is a projectionist (a room owner) and a projection room member. The projectionist can control a playback progress of a video viewed together.

Quantity of simultaneous viewers: is a quantity of viewers simultaneously viewing an episode.

Viewing progress: is a progress time of viewing a video by a user.

This application provides a video viewing method. This application also relates to a video viewing apparatus, a resource receiving method, a resource receiving apparatus, a computing device, a computer-readable storage medium, and a computer program. The video viewing method, the video viewing apparatus, the resource receiving method, the resource receiving apparatus, the computing device, the computer-readable storage medium, and the computer program are described in detail in the following embodiments one by one.

Figure 1:
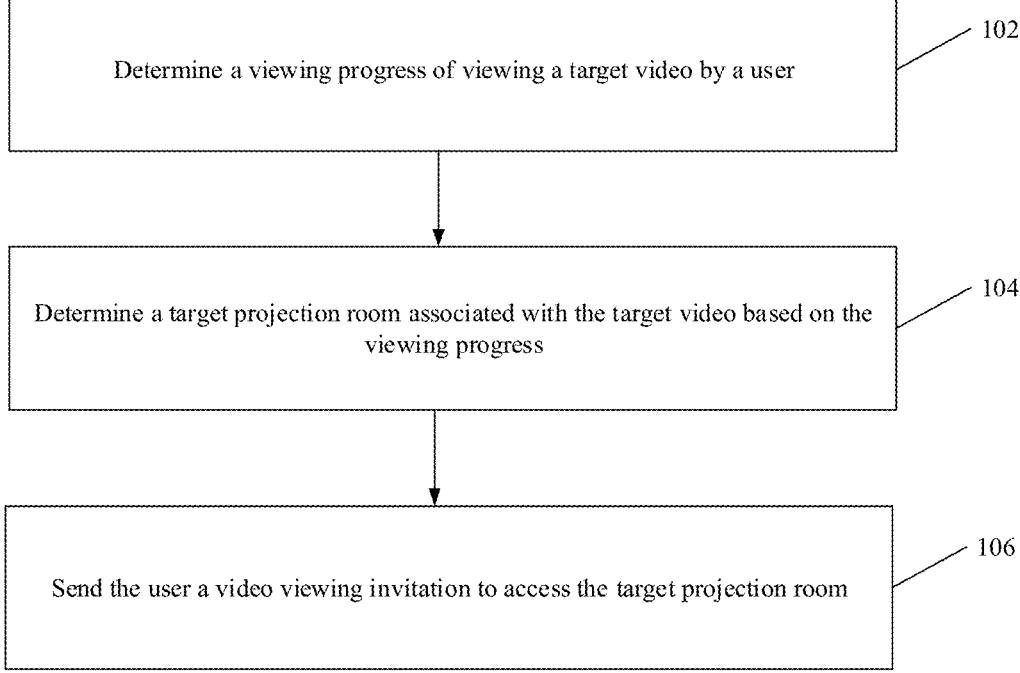
FIG. 1 is a flowchart of a video viewing method according to an embodiment of this application.

FIG. 1 is a flowchart of a video viewing method according to an embodiment of this application. The method specifically includes the following steps:

Step 102: Determine a viewing progress of viewing a target video by a user.

The target video may be any type of video, for example, an entertainment video, a sports video, or a teaching video; or may be a video of any duration, for example, a short video of three minutes or a long video of more than one hour; or may be a video in any format, for example, a video in an MPEG format or a video in an AVI format. This is not limited herein.

The viewing progress may be understood as a progress time of viewing the video by the user. For example, that the viewing progress of the user is 10 minutes indicates the user goes to a location in the target video with a time length of 10th minute.

In actual application, a plurality of persons may simultaneously view one video. However, when viewing the video, these persons do not know that there are other persons viewing the same video with them, and do not have direct contact with each other, making it impossible to view the video together in a true sense.

In this embodiment of this application, a projection room with a similar progress can be matched for the user based on the viewing progress of the target video by the user, so that the user can access the projection room to view the target video with others together.

It is considered that matching a corresponding projection room for the user in a video viewing process of the user may affect viewing experience of the user. Therefore, when a playback instruction is received, monitoring of the viewing progress of the user may be triggered, and a corresponding projection room is matched for the user. This provides a function of viewing the video together for the user to improve fun of the user to view the video, and greatly reduces impact on the viewing experience of the user. In a first optional implementation provided in this embodiment of this application, the step of determining a viewing progress of viewing a target video by a user is specifically implemented in the following manner:

receiving a playback instruction submitted by the user for the target video; and determining the viewing progress of viewing the target video by the user based on the playback instruction, where the viewing progress is a historical viewing progress.

The playback instruction is an instruction for instructing the target video to play. The historical viewing progress is a last viewing progress of the target video by the user. In actual application, the historical viewing progress of the target video by the user may be determined based on the playback instruction submitted by the user for the target video, so that the user can directly jump to the last viewing progress of the target video based on the historical viewing progress. In a specific implementation, determining the historical viewing progress of viewing the target video by the user may be determining the historical viewing progress of viewing the target video by the user based on a correspondence between recorded user information (for example, a user name or a user identity) and the historical viewing progress of the target video.

For example, when a playback instruction of a user U for a target video A is received, it is determined, according to a user identity UID1 of the user U and the pre-recorded correspondence between a user identity and a historical viewing progress, that a historical viewing progress for viewing the target video A by the user U is 10 minutes.

In addition to the foregoing determining the viewing progress of the user at the beginning of playback, if there are a relatively large quantity of persons viewing the target video, monitoring of a viewing progress of viewing the target video by each user may be triggered based on popularity (a quantity of simultaneous viewers), to provide a function of viewing the video together for users whose viewing progresses are similar in a viewing process, and improve fun of the user to view the video. In a second optional implementation provided in this embodiment of this application, the step of determining a viewing progress of viewing a target video by a user includes:

monitoring a third viewer quantity of users viewing the target video; and when the third viewer quantity is greater than or equal to a third quantity threshold, determining the viewing progress of viewing the target video by each user.

Specifically, a quantity (namely, the third viewer quantity) of the users viewing the target video is monitored to determine viewing popularity of the target video. If a quantity of persons viewing the target video reaches a preset quantity (namely, the third quantity threshold), that is, there are a relatively large quantity of the users viewing the target video, progress monitoring of these users may be triggered.

For example, if it is monitored that a third viewer quantity of users viewing the target video A is 150, and a preset third quantity threshold is 100, the third viewer quantity is greater than the third quantity threshold. Further, a viewing progress of viewing the target video by each of 150 persons is determined.

In addition to the foregoing two manner of determining the viewing progress of the user, to enable the user to still have an opportunity to match a projection room in the process of viewing the target video, detection of the viewing progress of the user may be triggered based on a progress adjustment amplitude of the target video by the user, to match a projection room with a similar progress for the user. In an optional implementation provided in this embodiment of this application, the step of determining a viewing progress of viewing a target video by a user further includes:

receiving a progress adjustment instruction of the user for the target video, where the progress adjustment instruction carries a target viewing progress; and when a difference between the target viewing progress and a current viewing progress is greater than a preset adjustment threshold, using the target viewing progress as the viewing progress; or when the target video starts playing from the target viewing progress and satisfies preset playback duration, determining a sum of the target viewing progress and the preset playback duration as the viewing progress.

The progress adjustment instruction is an instruction for adjusting a viewing progress of viewing the target video by the user. In a specific implementation, the progress adjustment instruction carries the target viewing progress. The target viewing progress may be understood as a new viewing progress obtained after the user performs progress adjustment on the target video. The current viewing progress may be understood as a viewing progress obtained before the user performs progress adjustment on the target video.

In actual application, that the difference between the target viewing progress and the current viewing progress is greater than the preset adjustment threshold (which may be understood as a preset progress adjustment amplitude) is used as a trigger condition for matching a projection room for the user. That is, when the user has a relatively large progress adjustment amplitude, the projection room is matched for the user. This avoids affecting viewing experience of the user due to frequent matching of the projection room for the user, and enables the user to have an opportunity to match different target projection rooms.

For example, when the target video plays for 10 minutes, a progress adjustment instruction of the user U for the target video A is received. A target viewing progress carried in the progress adjustment instruction is 25 minutes, a current viewing progress is 10 minutes, and a preset adjustment threshold is 10 minutes. In this case, a difference between the target viewing progress and the current viewing progress is 15 minutes, and the difference is greater than the preset adjustment threshold. Therefore, the target viewing progress of 25 minutes is determined as a viewing progress, to continue to perform the following step 104.

After the progress adjustment instruction of the user for the target video is received, in addition to the foregoing manner of determining the viewing progress of the user, it is considered that in an actual scenario, if the user adjusts the viewing progress of the target video, the user frequently adjusts the viewing progress within a period of time, to search for a video scenario desired by the user. To avoid a case in which the projection room is frequently matched for the user due to frequent adjustment of the viewing progress by the user, after the progress adjustment instruction is received and the target video plays for the preset playback duration, matching the projection room with the similar progress for the user may be triggered.

Specifically, that the target video starts playing from the target viewing progress and satisfies the preset playback duration means that after the target video is adjusted to the target viewing progress, the target video starts playing from the target viewing progress and plays for more than the preset playback duration (for example, 10 minutes or 5 minutes). Further, in this case, the sum of the target viewing progress and the preset playback duration is determined as the viewing progress, to match the projection room with the similar progress for the user based on the viewing progress.

For example, when the target video plays for 10 minutes, a progress adjustment instruction of the user U for the target video A is received. A target viewing progress carried in the progress adjustment instruction is 25 minutes. It is assumed that the preset playback duration is 10 minutes. When it is detected that the target video A starts playing from 25 minutes and plays for 10 minutes, the sum of the target viewing progress and the preset playback duration is 35 minutes. In this case, the 35 minutes are determined as the viewing progress, to continue to perform the following step 104.

Step 104: Determine a target projection room associated with the target video based on the viewing progress.

On the basis of the foregoing determining the viewing progress of viewing the target video by the user, it is considered that users viewing a same video cannot interact with each other in real time, that is, a degree of interaction is low. Therefore, matching a corresponding projection room for the user based on the viewing progress can match, for the user, a projection room meeting a viewing requirement of the user, namely, the target projection room, so that the user views the video in the target projection room together with another user, and performs interaction in the video viewing process.

The target projection room may be understood as a projection room that plays the target video and that is matched for the user. An invitation may be understood as a message with an entry link to access the target projection room. In actual application, message forms corresponding to the invitation may be various. For example, the message form may be a pop-up window form, a subtitle form, a bubble form, or a floating layer guide form. This is not limited herein. Further, the invitation may further carry a close control and an entry control, the close control is configured to close the invitation, and the entry control is configured to access the target projection room.

In a specific implementation, on the basis that the determined viewing progress is the historical viewing progress, in an actual scenario, the user may need to determine whether to view the target video starting from the historical viewing progress. Therefore, a target projection room with a progress similar to the viewing progress of the user is matched for the user based on a selection of the user. In an optional implementation provided in this embodiment of this application, before the step of determining a target projection room associated with the target video based on the viewing progress, the method further includes:

sending a viewing jump reminder to the user based on the viewing progress; and determining whether a jump instruction submitted by the user for the viewing jump reminder is received.

If yes, it indicates that the user accepts the historical viewing progress, and the foregoing step 104 is performed.

If no, it indicates that the user abandons the historical viewing progress, and a projection room whose playback progress of playing the target video is within a viewing progress is determined as the target projection room.

The viewing jump reminder may be understood as a viewing prompt (reminding the user of the historical viewing progress of the target video) based on the historical viewing progress (namely, the viewing progress). Correspondingly, the jump instruction may be understood as a jump instruction submitted based on the viewing jump reminder. Therefore, when the jump instruction is received, the target video jumps to a location of the historical viewing progress for playback. It indicates that the user receives the historical viewing progress. In this case, the target projection room is matched for the user based on the historical viewing progress (namely, the viewing progress).

In addition to the foregoing receiving the jump instruction for the viewing jump reminder, there still is a case in which no jump instruction is received. In this case, it indicates that the user abandons the historical viewing progress (namely, the viewing progress). That the user abandons the historical viewing progress may be because the user forgets video content previously viewed, or wants to view the previously viewed video content again, and so on. In this case, a projection room whose playback progress is within the historical viewing progress may be determined as the target projection room. Being within the historical viewing progress may be understood as the target video being within a progress interval from the beginning of playback to the historical viewing progress.

The foregoing example is still used. Assuming that a viewing instruction submitted by the user U for the historical viewing progress (10 minutes) of the target video A is not received, a projection room whose playback progress of playing the target video A is within 0 minutes to 10 minutes is determined as the target projection room.

In conclusion, when the jump instruction submitted by the user for the viewing jump reminder is received, the historical viewing progress is used as a current viewing progress of the user, and the target projection room is matched for the user, ensuring that the progress of the target projection room matched for the user is similar to the viewing progress of the user. When the user abandons the historical viewing progress, the target projection room is matched for the user in the historical viewing progress of the user, providing larger matching space for the projection room, and also increasing flexibility and rationality of matching the target projection room.

In a specific implementation, it is considered that each projection room has a playback progress of the target video. To ensure that the playback progress of the target video in the target projection room is relatively similar to the viewing progress of the user for the target video, and improve user satisfaction with the target projection room, in a first optional implementation provided in this embodiment of this application, the step of determining a target projection room associated with the target video based on the viewing progress includes:

determining a playback progress interval corresponding to the viewing progress based on the viewing progress and a preset progress matching rule; and determining whether there is a projection room whose playback progress of playing the target video is within the playback progress interval.

If yes, it indicates that there is a projection room matching the preset progress matching rule, and the projection room whose playback progress is within the playback progress interval is determined as the target projection room.

If no, it indicates that the projection room matching the preset progress matching rule does not exist, but it still wants to provide a function of viewing together for the user. Therefore, a projection room of the target video can be determined as the target projection room, and it is further determined whether there is a projection room playing the target video.

If yes, it indicates that there is a projection room playing the target video, and the projection room playing the target video is determined as the target projection room.

If no, it indicates that a projection room playing the target video does not exist. To provide the function of viewing together for the user, a projection room of an associated video of the target video may be further determined as the target projection room. Therefore, the associated video of the target video continues to be determined. When there is a projection room playing the associated video, the projection room playing the associated video is determined as the target projection room.

The preset progress matching rule is a preset rule of matching a viewing progress with a playback progress interval. Based on the viewing progress and the preset progress matching rule, a (matched) playback progress interval corresponding to the viewing progress may be determined. Specifically, the preset progress matching rule may be set to match a progress interval in which a playback progress is within 10% of the viewing progress as the playback progress interval; or may be set to match a progress interval in which a playback progress is before the viewing progress and is with a difference from the viewing progress within 5% of video duration as the playback progress interval; or may be set to match a progress interval in which a playback progress is within preset duration (for example, 5 minutes) before the viewing progress (and/or after the viewing progress) as the playback progress interval. This is not limited herein.

In actual application, it is considered that if the playback progress of the projection room is after the viewing progress, the user may miss some content of the target video when accessing the projection room to view, and the user is usually willing to match a projection room within a period of time before the viewing progress of the user. Therefore, the preset progress matching rule may be set to match the playback progress interval in which the playback progress is before the viewing progress.

The playback progress interval may be understood as an interval in which a playback progress of a to-be-matched projection room is located. The projection room whose playback progress is within the playback progress interval is determined as a matched projection room, namely, the target projection room. The playback progress may be understood as a playback progress of the target video in the projection room. For example, that the playback progress is 7 minutes indicates that the target video is projected in the projection room to a location in which video duration is 7 minutes.

In a specific implementation, a matching option may be further provided for the user to match the target projection room, for example, matching a target projection room whose playback progress is within 5 minutes before the viewing progress, or matching a target projection room whose playback progress is within 5 minutes after the viewing progress. This is not limited herein. Then, the matching option submitted by the user is used as the preset progress matching rule, to more flexibly match a target projection room meeting a requirement of the user for the user.

The foregoing example is still used. On the basis of determining that the historical viewing progress of viewing the target video A by the user U is 10 minutes, the preset progress matching rule is to match a playback progress interval in which a playback progress is before the viewing progress and is with a difference from the viewing progress within 10% of video duration, and the entire duration of the target video A is 60 minutes. In this case, it may be determined that the playback progress interval corresponding to the viewing progress of the user U is a playback progress interval from 10–60×10%=4 minutes to 10 minutes. When there is a projection room 1 in which a playback progress is 6 minutes, a determining result of determining whether there is a projection room whose playback progress of the target video A is from 4 minutes to 10 minutes is yes, and the projection room 1 is determined as the target projection room.

In actual application, there may be no projection room with a progress similar to the viewing progress of the user, but some users still hope to view a video together with another person. Therefore, a projection room playing the target video may be further determined as the target projection room.

The foregoing example is still used. Assuming that a determining result of determining whether there is a projection room whose playback progress of the target video A is from 4 minutes to 10 minutes is no, it is determined that whether there is a projection room for the target video A. When it is determined that a projection room 2 plays the target video A, the projection room 2 is determined as the target projection room.

Further, a user viewing the target video may not be accustomed to creating a projection room. Therefore, when there is currently no projection room for playing the target video, the associated video of the target video may be determined. Specifically, the associated video may be a video in a same episode set, or a video in a same series, or the like as the target video. This is not limited herein. For example, an episode set S includes ten episodes of videos, and the target video is a third episode of video. In this case, the associated video may be any one of nine videos in the ten episodes of videos other than the third episode of video. In addition, the associated video may also be understood as another video in a season episode set to which the target video belongs.

Further, the projection room playing the associated video is determined as the target projection room, so that the user can still enjoy the function of viewing together when the projection room playing the target video does not exist.

The foregoing example is still used. It is assumed that a result of determining whether there is the projection room for the target video A is no, and the target video A is the third episode of video in the episode set S. In this case, it is determined that the associated video of the target video A is one of nine videos in the episode set S to which the target video A belongs other than the target video A, and further it is determined whether there is a projection room playing any one of the nine videos. When there is a projection room 3 playing a fifth episode in the episode set S, the projection room 3 is determined as the target projection room.

It should be noted that there may be an issue of matching a plurality of projection rooms. In this case, a playback progress of each projection room may be compared with the viewing progress, and a projection room whose playback progress is closest to the viewing progress is determined as the target projection room.

In addition to the foregoing determining manner of determining the target projection room, there is still a case in which the viewing progress is empty. In this case, it indicates that the user starts to view the target video from the beginning. Therefore, a projection room in an unstarted state can be directly matched for the user, so that the user can start to view the target video from the beginning with another user. In a second optional implementation provided in this embodiment of this application, the step of determining a target projection room associated with the target video based on the viewing progress includes:

when the viewing progress is empty, determining a projection room whose playback status for the target video is an unstarted state as the target projection room.

When the viewing progress is empty, it may be understood that the historical viewing progress of the target video by the user is empty. This indicates that the user has not viewed the target video. For example, after the user submits the playback instruction, in response to the playback instruction, it is determined that the historical viewing progress of the user is empty. In addition, that the viewing progress is empty may be further understood as that the current viewing progress of the target video by the user is empty. The two cases indicate that the user intends to view the target video from the beginning.

That the playback status of the projection room is unstarted indicates that the projection room is in a waiting for playback state. In actual application, the playback status of the projection room may be manually modified by a projectionist (for example, the projectionist may manually modify the playback status of the projection room from the unstarted state to a started state). Alternatively, the playback status may be modified according to a preset rule (for example, when a preset person quantity is met, the playback status of the projection room is modified from the unstarted state to the started state). The unstarted state indicates that the projection room is waiting for another user to access for viewing the target video together. The projection room whose playback status is the unstarted state is determined as the target projection room, so that the user can view the target video together with the another user from the beginning.

It is assumed that the historical viewing progress of the target video A by the user U is determined as empty, and the projection room whose playback status is the unstarted state is determined as the target projection room.

In addition, in addition to the foregoing determining manner of determining the target projection room, on the basis of determining the viewing progress of each user for the target video, considering that viewing progresses of users are different, it is unreasonable if all users are added to a same projection room. Therefore, at least one target projection room may be determined based on the viewing progress of each user, so that users whose viewing progresses are similar access a projection room for viewing. In an optional implementation provided in this embodiment of this application, the step of determining a target projection room associated with the target video based on the viewing progress is specifically implemented in the following manners:

determining at least one target projection room associated with the target video based on the viewing progress of each user; and correspondingly, sending the user a video viewing invitation to access the target projection room includes:

sending each user a video viewing invitation to access a corresponding target projection room.

In actual application, a specific implementation of determining the at least one target projection room associated with the target video based on the viewing progress of each user is similar to a specific implementation of the foregoing determining the target projection room associated with the target video based on the viewing progress. Reference may be made to the specific implementation of the foregoing determining the target projection room associated with the target video based on the viewing progress. Details are not described herein again. In addition, because the viewing progresses of the users may be relatively similar or may not be similar, target projection rooms matched for the users may be different. Therefore, a quantity of the matched target projection rooms is also uncertain.

In a specific implementation, when there are two or more target projection rooms, different invitations may be created for the projection rooms, to send invitations matching playback progresses of the projection rooms to users having different viewing progresses.

Further, there may alternatively be a case in which a projection room playing a video in the video series does not exist. In this case, to implement the function of viewing together, the user may be invited to view the video together based on viewing popularity (a viewer quantity). In an optional implementation provided in this embodiment of this application, after the associated video of the target video is determined, the method further includes:

when the projection room playing the associated video does not exist, determining a first viewer quantity of first viewing users viewing the target video or the associated video; and when the first viewer quantity is greater than or equal to a first quantity threshold, sending a co-viewing invitation for the target video or the associated video to the first viewing users.

The first viewing users may be understood as all users viewing the target video or the associated video. In this embodiment of this application, when no target projection room is matched, a quantity of persons viewing the target video or the associated video, namely, the first viewer quantity, is first counted. When the first viewer quantity is greater than or equal to a specific quantity (namely, the first quantity threshold), the co-viewing invitation for the target video or the associated video is sent to the first viewing users.

The first quantity threshold is a preset quantity threshold of persons that triggers sending the co-viewing invitation for the target video or the associated video. This is due to a consideration that not all users are willing to view the video together. For example, although the co-viewing invitation is sent to 100 persons, there may be only 2 persons accepting the invitation (where 2/100=2% may be understood as a conversion percentage of accepted invitations in the sent invitations). Therefore, the first quantity threshold (for example, 100) can be preset based on a historical invitation accepted conversion percentage, to avoid that when the first viewer quantity is less than or equal to the first quantity threshold, viewing together cannot be successfully organized due to a small quantity of persons, and computing resources are wasted in sending the co-viewing invitation.

The co-viewing invitation may include the first viewer quantity of the first viewing users, and in addition, may further include an entry control (for example, a link or a button) and the like that enable the function of viewing together. This is not limited herein.

The co-viewing invitation is an invitation sent to the user when no target projection room is matched. Therefore, when there is a first user accepting the invitation, a projection room may be created based on a viewing progress of the first user, and the first user serves as a projectionist of the projection room. A user accepting the invitation after the first user directly accesses the projection room to view the video together.

The foregoing example is still used. It is assumed that the projection room playing the nine videos in the episode set S other than the target video A does not exist, it is determined that a first viewer quantity of first viewing users of the target video A is 120, and the first quantity threshold is 100. In this case, the first viewer quantity is greater than the first quantity threshold, and a co-viewing invitation is sent to the 120 first viewing users viewing the target videos A. The co-viewing invitation may include: message content of "there are 120 persons viewing the target video A" and a joining button displaying "join now".

Still further, after the sending a co-viewing invitation for the target video or the associated video to the first viewing users, the method further includes:

when a first invitation accepted instruction returned by a first target user in the first viewing users for the co-viewing invitation is received, creating a target projection room based on the invitation accepted instruction; and correspondingly, the method further includes:

receiving a second invitation accepted instruction returned by a second target user in the first viewing users for the co-viewing invitation; and adding the second target user to the target projection room based on the second invitation accepted instruction.

The first target user may be understood as a user in the first viewing users who first returns an invitation accepted instruction (the first invitation accepted instruction) for the co-viewing invitation. The second target user may be understood as at least one user in the first viewing users who returns the first invitation accepted instruction other than the first target user. The first invitation accepted instruction may be understood as an instruction for accepting the co-viewing invitation.

In actual application, when a 1st first invitation accepted instruction returned for the co-viewing invitation is received, because there is no projection room, the target projection room needs to be created. Specifically, a viewing progress carried in the first invitation accepted instruction may be used as a playback progress of the projection room to create the target projection room. Further, on the basis of creating the target projection room, if another user (the second target user) returns an invitation accepted instruction (namely, the second invitation accepted instruction) for the co-viewing invitation, the another user may directly access the target projection room and view together following the viewing progress of the first target user. The second invitation accepted instruction may be understood as an instruction for accepting the co-viewing invitation to access the target projection room.

In addition, based on the foregoing determining the viewing progress of viewing the target video by each user, users whose viewing progresses are similar in these persons may be further organized to view the target video together, thereby improving viewing fun of the user. In an optional implementation provided in this embodiment of this application, after the determining the viewing progress of viewing the target video by each user, the method further includes: dividing the target video into at least one viewing progress interval based on preset duration; and sending a co-viewing invitation for the target video in any viewing progress interval to a user whose viewing progress is in the any viewing progress interval.

The preset duration may be understood as preset progress duration. Specifically, the preset duration may be set according to a progress span that is usually acceptable to the user. For example, the preset duration may be 10 minutes, or may be 5 minutes. This is not limited herein.

Further, the target video is divided into the at least one viewing progress interval according to the preset duration. For example, the preset duration is 10 minutes, and the target video A is 50 minutes. In this case, the target video may be divided into five viewing progress intervals. The five viewing progress intervals are respectively 1 minute to 10 minutes, 11 minutes to 20 minutes, 21 minutes to 30 minutes, 31 minutes to 40 minutes, and 41 minutes to 50 minutes.

The foregoing example is still used. The third quantity of viewers who view the target video A is 150, and viewing progresses of 25 users are within 1 minute to 10 minutes. In this case, a co-viewing invitation for the target video A within 1 minute to 10 minutes is sent to the 25 users.

In actual application, there is a case in which it is determined, based on the viewing progress, that the target projection room playing the target video does not exist, that is, there is no target projection room. In this case, to enable the user to further use the function of viewing together, based on the viewing progress of the user and the viewing popularity (the viewer quantity), the user can view the target video together with another user with a similar viewing progress. In an optional implementation provided in this embodiment of this application, after the step of determining a viewing progress of viewing a target video by a user, the method further includes:

determining, based on the viewing progress, whether there is the target projection room associated with the target video;

if no, determining a corresponding viewing progress interval based on the viewing progress;

monitoring a second viewer quantity of second viewing users whose viewing progresses of viewing the target video are within the viewing progress interval; and when the second viewer quantity is greater than or equal to a second quantity threshold, sending a co-viewing invitation for the target video in the viewing progress interval to the second viewing users.

Specifically, when no target projection room is matched, a determining manner of determining the corresponding viewing progress interval based on the viewing progress is similar to a specific implementation of the foregoing determining the viewing progress to determine the corresponding playback progress interval. Reference may be made to the specific implementation of the foregoing determining the viewing progress to determine the corresponding playback progress interval. Details are not described herein again. Specifically, the viewing progress interval is determined to determine a progress interval similar to the viewing progress of the user.

On the basis of determining the viewing progress interval, to monitor a user whose viewing progress is similar to that of the user, a user (namely, the second viewing user) whose viewing progress of viewing the target video is in the viewing progress interval is monitored, and a quantity (namely, the second viewer quantity) of users who view the target video in the viewing progress interval is counted. When the second viewer quantity is greater than or equal to the second quantity threshold, the co-viewing invitation for the target video in the viewing progress interval is sent to the second viewing users.

The second quantity threshold is a preset quantity threshold of persons for triggering sending the co-viewing invitation for the target video in the viewing progress interval. When the second viewer quantity is greater than or equal to the second quantity threshold, the co-viewing invitation is sent to each second viewing user. This improves success of viewing the video together, ensures similarity of viewing progresses of invited users, and further improves fun of the user to view the video.

Step 106: Send the user the video viewing invitation to access the target projection room.

On the basis of the foregoing determining the target projection room, the video viewing invitation to access the target projection room is sent to the user, so that the user accesses the target projection room based on the invitation to view the video with the another user.

Further, after the invitation to access the target projection room for viewing the target video is sent to the user, the user may access the target projection room based on the invitation, and may perform message communication while viewing the target video. In an optional implementation provided in this embodiment of this application, after the step of sending the user the video viewing invitation to access the target projection room, the method further includes:

receiving a third invitation accepted instruction submitted by the user based on the invitation; and adding the user to the target projection room in response to the third invitation accepted instruction, where the target projection room includes a message communication control and a message display area.

The third invitation accepted instruction may be understood as an instruction to accept the video viewing invitation to access the target projection room. Specifically, if tapping an access control provided in the invitation, the user may submit the third invitation accepted instruction. After the third invitation accepted instruction submitted by the user is received, the user is added to the target projection room, so that the user directly views the target video in the target projection room.

Further, to enable users in the target projection room to communicate with each other and establish a social relationship, in addition to playing the target video, the target projection room may further include: a control that is used to perform message communication, namely, the message communication control (for example, a message input box or a message sending button), and the message display area that is used to display a private message sent by the user, public information, or the like.

In addition, to improve viewing experience of the user, a control for closing a message and/or opening a message may also be provided, so that the user can freely choose whether to participate in or view the message communication in a process of viewing the target video.

In conclusion, according to the video viewing method provided in this application, the viewing progress of viewing the target video by the user is determined; on the basis of determining the viewing progress, the target projection room associated with the target video is determined based on the viewing progress; and the video viewing invitation to access the target projection room is sent to the user. This implements that the projection room with the similar progress is matched for the user based on the viewing progress of the user, so that the user can access the projection room to view the video together with the another user, and the user establishes the social relationship with the another user in a same projection room, thereby improving viewing fun of the user.

Figure 2:
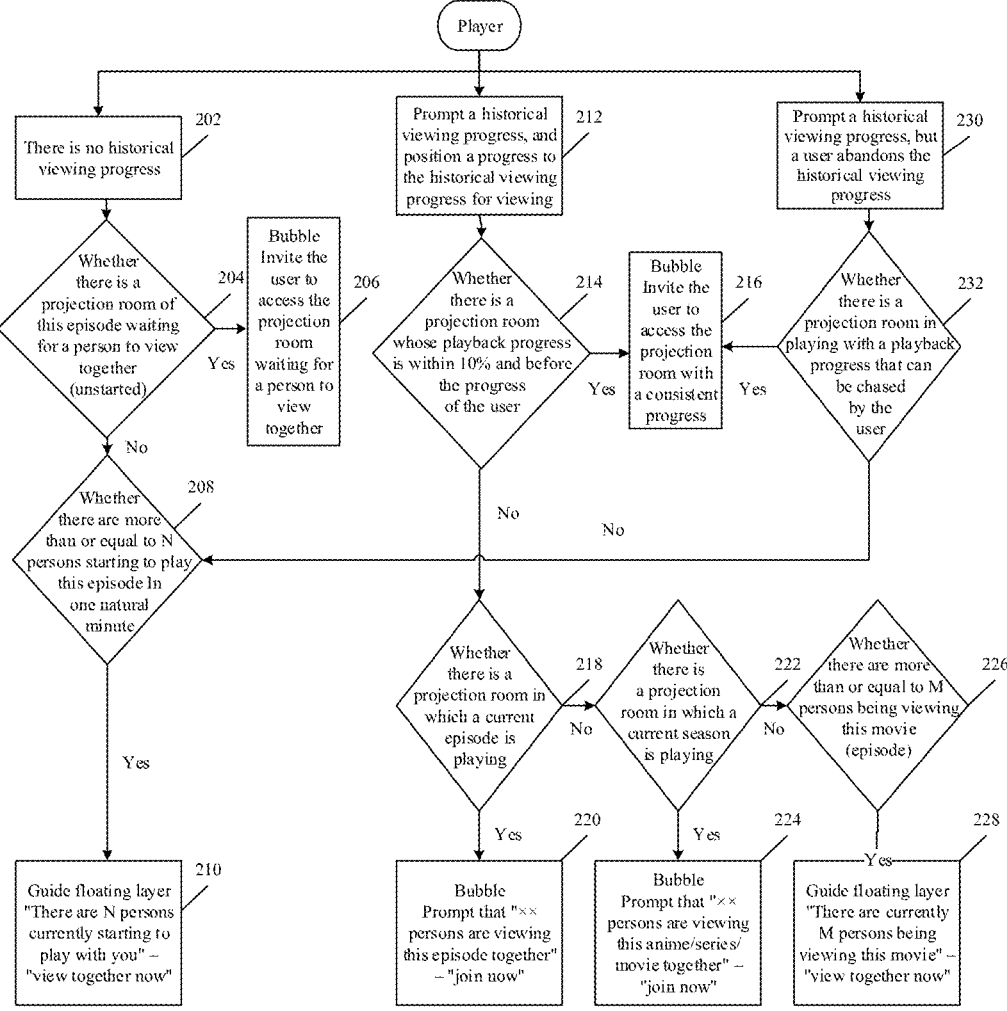
FIG. 2 is a processing flowchart of a video viewing method applied to a movie and television video viewing scenario according to an embodiment of this application.

With reference to FIG. 2, the following further describes the video viewing method by using an example in which the video viewing method provided in this application is applied to a movie and television video viewing scenario. FIG. 2 is a processing flowchart of a video viewing method applied to a movie and television video viewing scenario according to an embodiment of this application. The method specifically includes the following steps.

In this embodiment of this application, when a playback instruction of a user for a target video is received and a historical viewing progress of viewing the target video by the user is determined in response to the playback instruction, there are three execution procedures based on the historical viewing progress. A first execution procedure includes step 202 to step 210.

Step 202: Determine that the historical viewing progress of viewing the target video by the user is empty, that is, there is no historical viewing progress.

Step 204: Determine whether there is a projection room of this episode of the target video waiting for a person to view together.

If yes, it indicates that there is a projection room with a playback status being unstarted, it also indicates that there is a projection room for the target video and with an empty playback progress, that is, a playback progress of the projection room is consistent with the viewing progress of the user. In this case, the following step 206 is performed.

If no, it indicates that a projection room with a playback status being unstarted does not exist.

In this case, the following step 208 is performed.

Step 206: Send an invitation in a form of a bubble, to invite the user to access the projection room waiting for the person to view the target video together.

Step 208: Determine whether there are more than or equal to N persons starting to play this episode of the target video in one natural minute.

If yes, it indicates that there are more than or equal to N persons whose viewing progresses are similar to that of the user. In this case, the following step 210 is performed.

If no, it indicates that there are not enough persons whose viewing progresses are similar to that of the user. In this case, no operation is required.

Step 210: Send an invitation in a form of a guide floating layer, to prompt that "there are N persons currently starting to play with you"-"view together now".

Specifically, there are N persons currently starting to play in one minute, and these persons are prompted to access the projection room together (matched to access the projection room).

Figure 3A:
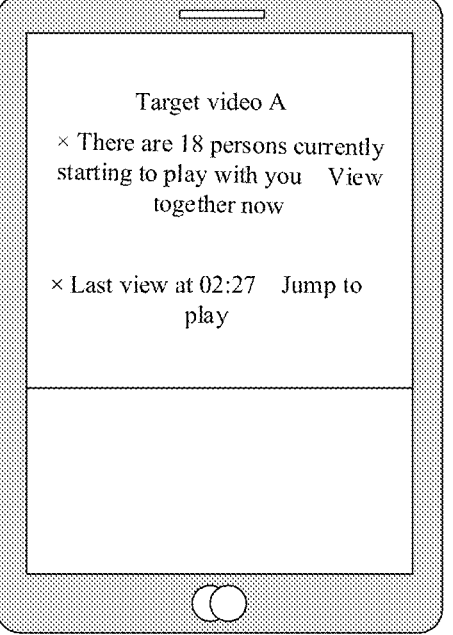
FIG. 3(a), FIG. 3(b), FIG. 3(c) are schematic diagrams of invitation manners in a video viewing method according to an embodiment of this application.

For example, the invitation in the form of the guide floating layer may be shown in FIG. 3(a). The invitation includes prompt information of "there are 18 persons currently starting to play with you" and a control of "view together now". The control is used by the user to tap to access the projection room. In addition, the invitation may further include a close control, so that the user taps to close the invitation.

The control marked as "view together now" may be used by the user to tap to access the projection room. The prompt may be understood as an invitation in the foregoing embodiment. A second execution procedure includes step 212 to step 228.

Step 212: Remind the user of the historical viewing progress, and position a progress to the historical viewing progress for viewing.

Specifically, a prompt message for reminding the user of the historical viewing progress may be shown in FIG. 3(a). The prompt message is "last view at 02:27" and a control of "jump to play" is provided. The control is used by the user to tap to jump to the historical viewing progress 02:27 for playback.

Figure 3B:
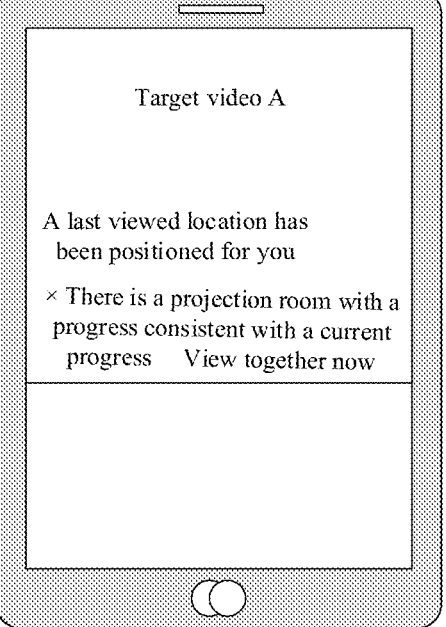

After the historical viewing progress is positioned for viewing, as shown in FIG. 3(b), a message prompt of "a last viewed location has been positioned" may be displayed, that is, a message prompt of positioning a location indicated by the historical viewing progress.

Step 214: Determine whether there is a projection room whose playback progress is before the progress of the user and is with a difference from the progress of the user within 10% of video duration.

If yes, it indicates that there is a projection room whose progress is similar to that of the user. In this case, the following step 216 is performed.

If no, it indicates that a projection room whose progress is similar to that of the user does not exist. In this case, the following step 218 is performed.

Step 216: Send an invitation in a form of a bubble, to invite the user to access the projection room with a consistent progress.

Specifically, a current progress (a progress positioned according to the historical viewing progress) reaches a location, for example, a fifth minute location in the target video. In comparison with a progress of a projection room currently in playing, if the progress of the projection room (which may be understood as the playback progress in the foregoing embodiment) is in the first 10% of the progress, and the projection room is in playing, a prompt bubble invitation appears to access the projection room with the consistent progress.

For example, the invitation in a form of a bubble may be shown in FIG. 3(b). The invitation includes prompt information of "there is a projection room with a progress consistent with a current progress", and a control of "view together now". The control is used by the user to tap to access the projection room. In addition, the invitation may further include a close control for the user to tap to close the invitation.

Step 218: Determine whether there is a projection room in which a current episode of target video is playing.

If yes, it indicates that there is the projection room in which the episode of target video plays. In this case, the following step 220 is performed.

If no, it indicates that the projection room in which the episode of target video plays does not exist. In this case, the following step 222 is performed.

Step 220: Send an invitation in a form of a bubble, to prompt that "xx persons are viewing this episode together"- "join now".

Step 222: Determine whether there is a projection room in which a current season is playing.

If yes, it indicates that there is the projection room in which this season to which the target video belongs plays. In this case, the following step 224 is performed.

If no, it indicates that the projection room in which this season to which the target video belongs plays does not exist. In this case, the following step 226 is performed.

The current season may be understood as an associated video of the target video.

Step 224: Send an invitation in a form of a bubble, to prompt that "xx persons are viewing this anime/series/ movie together"-"join now".

Specifically, if there is the projection room of the current season, a prompt is (xx persons are viewing this anime/ series/movie together). If there is a projection room in which a current episode is playing, a prompt is (xx persons are viewing this episode together).

Figure 3C:
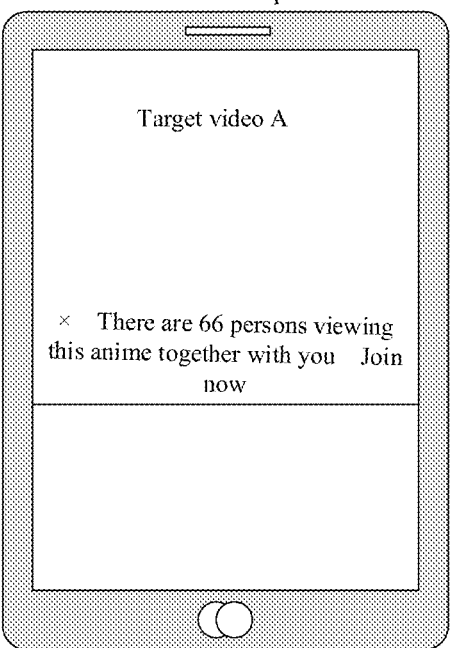

For example, the invitation in the form of a bubble may be shown in FIG. 3(*c*). The invitation includes prompt information of "there are 66 persons viewing this anime together with you" and a control of "join now". The control is used by the user to tap to access the projection room. In addition, the invitation may further include a close control for the user to tap to close the invitation.

Step 226: Determine whether there are more than or equal to M persons being viewing this movie (episode).

If yes, it indicates that popularity of the target video is relatively high. In this case, the following step 228 is performed.

If no, it indicates that popularity of the target video is relatively low. In this case, no operation is required.

Step 228: Send an invitation in a form of a guide floating layer, to prompt that "there are currently M persons being viewing this movie"-"view together now".

A third execution procedure includes step 230 and step 232.

Step 230: Prompt the historical viewing progress, but the user abandons the historical viewing progress.

Step 232: Determine whether there is a projection room in playing with a playback progress that can be chased by the user.

If yes, it indicates that there is a projection room whose progress is similar to the viewing progress of the user. In this case, the foregoing step 216 is performed.

If no, it indicates that a projection room whose progress is similar to the viewing progress of the user does not exist. In this case, the foregoing step 208 is performed.

The progress that can be chased by the user may be understood as being within the historical viewing progress of the user.

It should be noted that both the bubble and the guide floating layer are optional forms of sending invitations. The form of the invitation is not limited in this embodiment of this application. According to the video viewing method provided in this application, the viewing progress of viewing the target video by the user is determined; on the basis of determining the viewing progress, a target projection room associated with the target video is determined based on the viewing progress; and a video viewing invitation to access the target projection room is sent to the user. This implements that a projection room with a progress similar to the historical viewing progress of the user is matched for the user based on the historical viewing progress of the user, so that the user can access the projection room to view the video together with another user, and the user establishes a social relationship with the another user in a same projection room, thereby improving viewing fun of the user.

FIG. 4 is a flowchart of a resource receiving method according to an embodiment of this application. The method specifically includes the following steps:

Step 402: Determine a reception progress of a user for a target multimedia resource.

Specifically, the target multimedia resource includes a video, an audio, a picture, a text, and the like. This is not limited herein. Correspondingly, the reception progress includes a viewing progress, a listening progress, a browsing progress, and the like. This is not limited herein.

Step 404: Determine a target playback room associated with the target multimedia resource based on the reception progress.

The target playback room may be understood as a playback room matching the reception progress. The playback room may accommodate a preset quantity of (for example, 99) persons, so that the persons in a same playback room share a same playback progress.

Step 406: Send the user a resource reception invitation to access the target playback room. Further, after receiving the resource reception invitation, the user may choose whether to access the target playback room to receive the target multimedia resource together with another user.

For example, the target multimedia resource is a target audio. A listening progress of the user for the target audio is determined; a target playback room associated with the target audio is determined based on the listening progress; and an audio listening invitation to access the target playback room is sent to the user. In a specific implementation, a specific implementation of this embodiment of this application is similar to the specific implementations of the foregoing method embodiments. Reference may be made to the specific implementation of the foregoing video viewing method. Details are not described herein again.

In conclusion, according to the resource receiving method provided in this application, the reception progress of the user for the target multimedia resource is determined; on the basis of determining the reception progress, the target playback room associated with the target multimedia resource is determined based on the reception progress; and the resource reception invitation to access the target playback room is sent to the user. This implements that a playback room with a similar progress is matched for the user based on the reception progress of the user, so that the user can access the playback room and receive the multimedia resource together with the another user, and the user establishes a social relationship with the another user in the same playback room, thereby improving reception fun of the user.

Corresponding to the method embodiment of the foregoing video viewing method, this application further provides an embodiment of a video viewing apparatus. FIG. 5 is a schematic diagram of a structure of a video viewing apparatus according to an embodiment of this application. As shown in FIG. 5, the apparatus includes:

a first progress determining means 502, configured to determine a viewing progress of viewing a target video by a user;

a projection room determining means 504, configured to determine a target projection room associated with the target video based on the viewing progress; and a first sending means 506, configured to send the user a video viewing invitation to access the target projection room.

Optionally, the first progress determining means 502 is further configured to:

a playback instruction receiving sub-means, configured to receive a playback instruction submitted by the user for the target video; and a first progress determining sub-means, configured to determine the viewing progress of viewing the target video by the user based on the playback instruction, where the viewing progress is a historical viewing progress.

Optionally, the projection room determining means 504 is further configured to:

a first interval determining sub-means, configured to determine a playback progress interval corresponding to the viewing progress based on the viewing progress and a preset progress matching rule; and a first judging sub-means, configured to determine whether there is a projection room whose playback progress of playing the target video is within the playback progress interval.

If yes, the first determining sub-means is run, and the first determining sub-means is configured to determine the projection room whose playback progress is within the playback progress interval as the target projection room.

Optionally, the projection room determining means 504 is further configured to:

a second determining sub-means, configured to: when the viewing progress is empty, determine a projection room whose playback status for the target video is an unstarted state as the target projection room.

Optionally, the projection room determining means 504 is further configured to:

a reminder sending sub-means, configured to send a viewing jump reminder to the user based on the historical viewing progress; and a third determining sub-means, configured to: when a jump instruction submitted by the user for the viewing jump reminder is not received, determine a projection room whose playback progress of playing the target video is within the historical viewing progress as the target projection room.

Optionally, the projection room determining means 504 is further configured to:

a second judging sub-means, configured to determine whether there is a projection room playing the target video.

If yes, a fourth determining sub-means is run, and the fourth determining sub-means is configured to determine the projection room playing the target video as the target projection room.

Optionally, the projection room determining means 504 is further configured to:

an associated video determining sub-means, configured to determine an associated video of the target video; and a fifth determining sub-means, configured to: when there is a projection room playing the associated video, determine the projection room playing the associated video as the target projection room.

Optionally, the video viewing apparatus further includes:

a person quantity determining means, configured to: when the projection room playing the associated video does not exist, determine a first viewer quantity of first viewing users viewing the target video or the associated video; and a first invitation sending means, configured to: when the first viewer quantity is greater than or equal to a first quantity threshold, send a co-viewing invitation for the target video or the associated video to the first viewing users.

Optionally, the video viewing apparatus further includes:

a creation means, configured to: when a first invitation accepted instruction returned by a first target user in the first viewing users for the co-viewing invitation is received, create a target projection room based on the invitation accepted instruction; and correspondingly, the apparatus further includes:

a first instruction receiving means, configured to receive a second invitation accepted instruction returned by a second target user in the first viewing users for the co-viewing invitation; and a first addition means, configured to add the second target user to the target projection room based on the second invitation accepted instruction.

Optionally, the video viewing apparatus further includes:

a judging means, configured to determine, based on the viewing progress, whether there is the target projection room associated with the target video, where if no, an interval determining means is run, and the interval determining means is configured to determine a corresponding viewing progress interval based on the viewing progress;

a monitoring means, configured to monitor a second viewer quantity of second viewing users whose viewing progresses of viewing the target video are within the viewing progress interval; and a second invitation sending means, configured to: when the second viewer quantity is greater than or equal to a second quantity threshold, send a co-viewing invitation for the target video in the viewing progress interval to the second viewing users.

Optionally, the first progress determining means 502 is further configured to:

an adjustment instruction receiving sub-means, configured to receive a progress adjustment instruction submitted by the user for the target video; and a second progress determining sub-means, configured to: when a difference between a target viewing progress carried in the progress adjustment instruction and a current viewing progress is greater than a preset adjustment threshold, determine the target viewing progress as the viewing progress.

Optionally, the first progress determining means 502 is further configured to:

a person quantity monitoring sub-means, configured to monitor a third viewer quantity of users viewing the target video; and when the third viewer quantity is greater than or equal to a third quantity threshold, determine a viewing progress of viewing the target video by each user.

Correspondingly, the projection room determining means 504 is further configured to:

determine at least one target projection room associated with the target video based on the viewing progress of each user.

Correspondingly, the first sending means 506 is further configured to:

send each user a video viewing invitation to access a corresponding target projection room.

Optionally, the video viewing apparatus further includes:

a division means, configured to divide the target video into at least one viewing progress interval based on preset duration; and a third invitation sending means, configured to send a co-viewing invitation for the target video in a same viewing progress interval in the at least one viewing progress interval to a user whose viewing progress is in the same viewing progress interval.

Optionally, the video viewing apparatus further includes:

a second instruction receiving means, configured to receive a third invitation accepted instruction submitted by the user based on the invitation; and a second addition means, configured to add the user to the target projection room in response to the third invitation accepted instruction, where the target projection room includes a message communication control and a message display area.

In conclusion, according to the video viewing apparatus provided in this application, the viewing progress of viewing the target video by the user is determined; on the basis of determining the viewing progress, the target projection room associated with the target video is determined based on the viewing progress; and the video viewing invitation to access the target projection room is sent to the user. This implements that a projection room with a similar progress is matched for the user based on the viewing progress of the user, so that the user can access the projection room to view the video together with another user, and the user establishes a social relationship with the another user in a same projection room, thereby improving viewing fun of the user.

The foregoing describes a schematic solution of a video viewing apparatus in this embodiment. It should be noted that the technical solution of the video viewing apparatus and the technical solution of the foregoing video viewing method belong to a same concept. For detailed content not described in detail in the technical solution of the video viewing apparatus, refer to the descriptions of the technical solution of the foregoing video viewing method.

Figure 6:
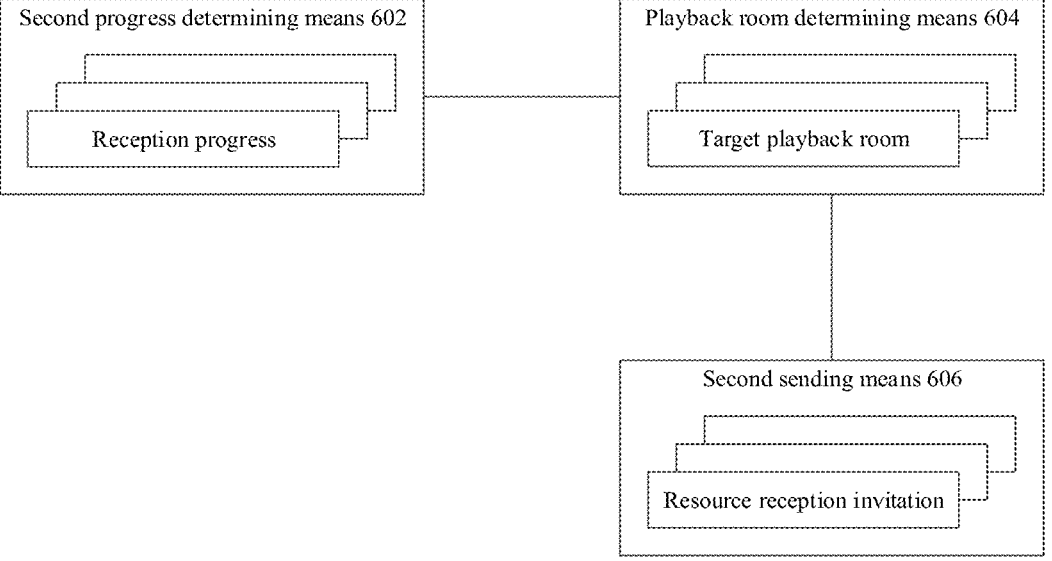
FIG. 6 is a schematic diagram of a structure of a resource receiving apparatus according to an embodiment of this application.

Corresponding to the method embodiment of the resource receiving method, this application further provides an embodiment of a resource receiving apparatus. FIG. 6 is a schematic diagram of a structure of a resource receiving apparatus according to an embodiment of this application. As shown in FIG. 6, the apparatus includes:

a second progress determining means 602, configured to determine a reception progress of a user for a target multimedia resource;

a playback room determining means 604, configured to determine a target playback room associated with the target multimedia resource based on the reception progress; and a second sending means 606, configured to send the user a resource reception invitation to access the target playback room.

In conclusion, according to the resource receiving apparatus provided in this application, the reception progress of the user for the target multimedia resource is determined; on the basis of determining the reception progress, the target playback room associated with the target multimedia resource is determined based on the reception progress; and the resource reception invitation to access the target playback room is sent to the user. This implements that a playback room with a similar progress is matched for the user based on the reception progress of the user, so that the user can access the playback room and receive the multimedia resource together with another user, and the user establishes a social relationship with the another user in a same playback room, thereby improving reception fun of the user.

The foregoing describes a schematic solution of the resource receiving apparatus in this embodiment. It should be noted that the technical solution of the resource receiving apparatus and the technical solution of the resource receiving method belong to the same concept. For detailed content not described in detail in the technical solution of the resource receiving apparatus, refer to the descriptions of the technical solution of the resource receiving method.

Figure 7:
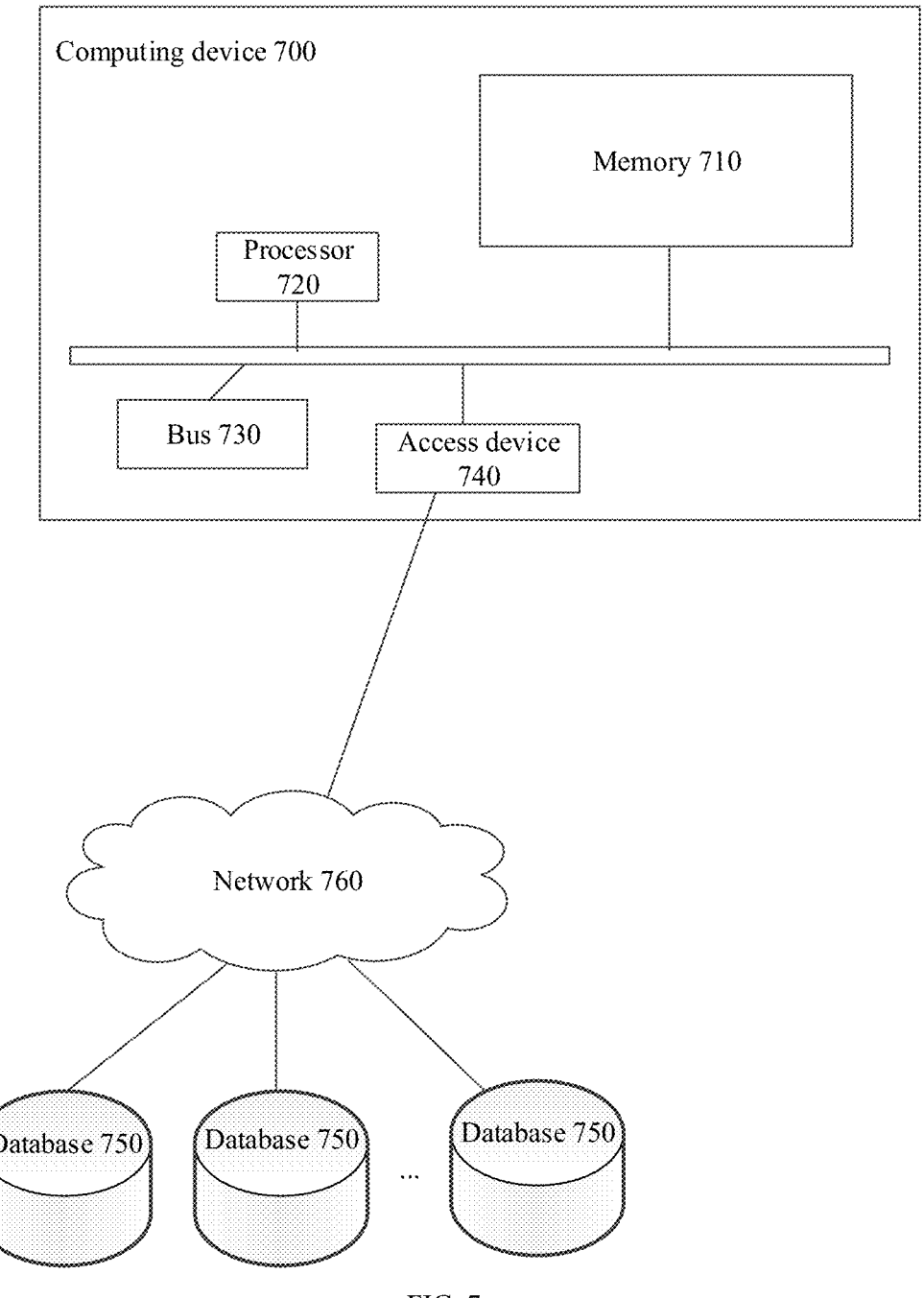
FIG. 7 is a block diagram of a structure of a computing device according to an embodiment of this application.

FIG. 7 is a block diagram of a structure of a computing device 700 according to an embodiment of this specification. Components of the computing device 700 include but are not limited to a memory 710 and a processor 720. The processor 720 is connected to the memory 710 by using a bus 730. A database 750 is configured to store data.

The computing device 700 further includes an access device 740. The access device 740 enables the computing device 700 to perform communication by using one or more networks 760. Examples of these networks include a public switched telephone network (PSTN), a local area network (LAN), a wide area network (WAN), a private area network (PAN), or a combination of communication networks such as the Internet. The access device 740 may include one or more of any type of wired or wireless network interface (for example, a network interface card (NIC)), such as an IEEE802.11 wireless local area network (WLAN) wireless interface, a worldwide interoperability for microwave access (Wi-MAX) interface, an Ethernet interface, a universal serial bus (USB) interface, a cellular network interface, a Bluetooth interface, and a near field communication (NFC) interface.

In an embodiment of this specification, the foregoing components of the computing device 700 and other components not shown in FIG. 7 may be connected to each other, for example, by using a bus. It should be understood that, the block diagram of the structure of the computing device shown in FIG. 7 is merely used as an example instead of a limitation on the scope of this specification. A person skilled in the art can add or replace other components as required.

The computing device 700 may be any type of stationary or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses), or another type of mobile device, or a stationary computing device such as a desktop computer or a PC. The computing device 700 may alternatively be a mobile or stationary server.

When the processor 720 executes the computer instructions, the steps of the video viewing method or the resource receiving method are implemented.

The foregoing describes a schematic solution of the computing device in this embodiment. It should be noted that the technical solution of the computing device and the technical solution of the video viewing method or the resource receiving method belong to the same concept. For detailed content not described in detail in the technical solution of the computing device, refer to the descriptions of the technical solution of the video viewing method or the resource receiving method.

An embodiment of this application further provides a computer-readable storage medium, storing computer instructions, and the instructions are executed by a processor to implement the steps of the video viewing method or the resource receiving method.

The foregoing describes a schematic solution of the computer-readable storage medium in this embodiment. It should be noted that the technical solution of the storage medium and the technical solution of the video viewing method or the resource receiving method belong to the same concept. For detailed content not described in detail in the technical solution of the storage medium, refer to the descriptions of the technical solution of the video viewing method or the resource receiving method.

An embodiment of this application further provides a computer program, and when the computer program is executed on a computer, the computer is enabled to perform the steps of the video viewing method or the resource receiving method.

The foregoing describes a schematic solution of the computer program in this embodiment. It should be noted that the technical solution of the computer program and the technical solution of the video viewing method or the resource receiving method belong to the same concept. For detailed content not described in detail in the technical solution of the computer program, refer to the descriptions of the technical solution of the video viewing method or the resource receiving method.

Specific embodiments of this application are described above. Other embodiments fall within the scope of the appended claims. In some cases, actions or steps described in the claims may be performed in an order different from that in the embodiments and desired results may still be achieved. In addition, processes described in the accompanying drawings do not necessarily require shown specific orders or sequences to achieve the desired results. In some implementations, multitasking and parallel processing are also possible or may be advantageous.

The computer instructions include computer program code, and the computer program code may be in a source code form, an object code form, an executable file form, some intermediate forms, or the like. The computer-readable medium may include: any entity or apparatus, a recording medium, a USB flash drive, a removable hard disk, a magnetic disk, a compact disc, a computer memory, a read-only memory (ROM), a random access memory (RAM), an electrical carrier signal, a telecommunication signal, a software distribution medium, and the like that are capable of carrying the computer program code. It should be noted that the content included in the computer-readable medium can be appropriately added or deleted depending on requirements of the legislation and patent practice in a jurisdiction. For example, in some jurisdictions, according to the legislation and patent practice, the computer-readable medium does not include an electrical carrier signal or a telecommunication signal.

It should be noted that, for brief description, the foregoing method embodiments are represented as a combination of a series of actions. However, a person skilled in the art should be aware that this application is not limited to the described order of the actions, because some steps may be performed in other orders or simultaneously according to this application. In addition, a person skilled in the art should also be aware that the embodiments described in this specification are all example embodiments, and used actions and means are not necessarily mandatory to this application.

In the foregoing embodiments, the descriptions of the embodiments have respective focuses. For a part that is not described in detail in a specific embodiment, refer to related descriptions in other embodiments.

The example embodiments of this application disclosed above are merely intended to help describe this application. In the optional embodiments, not all details are described in detail, and the present invention is not limited to only the specific implementations. Clearly, many modifications and variations may be made based on the content of this application. In this application, these embodiments are selected and specifically described to better explain the principle and actual application of this application, so that a person skilled in the art can well understand and use this application. This application is only subject to the claims and a full scope and equivalents thereof.

What is claimed is:

1. A method of viewing videos, comprising:
   determining a viewing progress of viewing a target video, wherein the determining a viewing progress of viewing a target video comprises:
   receiving a progress adjustment instruction with respect to the target video, wherein the progress adjustment instruction carries a target viewing progress, and
   when a difference between the target viewing progress and a current viewing progress is greater than a preset adjustment threshold, determining the target viewing progress as the viewing progress, or when a playback duration of the target video that starts playing from the target viewing progress satisfies a preset playback duration, determining a sum of the target viewing progress and the preset playback duration as the viewing progress;
   determining a target projection room associated with the target video based on the viewing progress; and
   sending a video co-viewing invitation to access the target projection room, wherein the target projection room comprises a control configured to perform message communications among viewers, and wherein the target projection room further comprises an area of displaying messages.

2. The method according to claim 1, wherein the determining a viewing progress of viewing a target video comprises:
   receiving a playback instruction with respect to the target video submitted by the user; and
   determining the viewing progress of viewing the target video by the user based on the playback instruction, wherein the viewing progress is a historical viewing progress.

3. The method according to claim 1, wherein before the determining a target projection room associated with the target video based on the viewing progress, the method further comprises:
   sending a viewing jump reminder to a user based on the viewing progress;
   determining whether a jump instruction in response to the viewing jump reminder is received from the user; and
   executing the determining a target projection room associated with the target video based on the viewing progress in response to receiving the jump instruction.

4. The method according to claim 3, wherein in response to determining that no jump instruction is received from the user, the determining a target projection room associated with the target video based on the viewing progress comprises:

determining a projection room with a playback progress of playing the target video being within the viewing progress as the target projection room.

5. The method according to claim 1, wherein the determining a target projection room associated with the target video based on the viewing progress comprises:

determining a playback progress range corresponding to the viewing progress based on the viewing progress and a preset progress matching rule;

determining whether there exists a projection room whose playback progress of playing the target video is within the playback progress range; and in response to determining that there exists the projection room whose playback progress of playing the target video is within the playback progress range, determining the projection room as the target projection room.

6. The method according to claim 1, wherein the determining a target projection room associated with the target video based on the viewing progress comprises:

determining a projection room with a playback status of playing the target video being in an unstarted state as the target projection room when the viewing progress is empty.

7. The method according to claim 1, wherein the method further comprises:

determining whether there is a projection room playing the target video; and in response to determining that there is the projection room playing the target video, determining the projection room playing the target video as the target projection room.

8. The method according to claim 7, wherein in response to determining that no projection room is playing the target video, the method further comprises:

determining an associated video that is associated with the target video;

determining that there exists a projection room playing the associated video; and determining the projection room playing the associated video as the target projection room.

9. The method according to claim 1, wherein the method further comprises:

determining whether there exists a projection room playing the target video or an associated video that is associated with the target video;

in response to determining that the projection room playing the target video or the associated video does not exist, determining a first quantity of first viewers who are viewing the target video or the associated video; and sending a co-viewing invitation for co-viewing the target video or the associated video to the first viewers in response to determining that the first quantity is greater than or equal to a first threshold.

10. The method according to claim 9, wherein the method further comprises:

in response to receiving an instruction indicative of accepting the co-viewing invitation returned by a first target user among the first viewers, creating a target projection room based on the instruction indicative of accepting the co-viewing invitation;

receiving one other instruction indicative of accepting the co-viewing invitation returned by a second target user among the first viewers; and adding the second target user to the target projection room based on the other instruction indicative of accepting the co-viewing invitation.

11. The method according to claim 1, wherein the method further comprises:

determining, based on the viewing progress, whether there exists the target projection room associated with the target video;

determining a viewing progress range based on the viewing progress in response to determining that there does not exist the target projection room associated with the target video;

monitoring a second quantity of second viewers whose viewing progresses of viewing the target video are within the viewing progress range; and sending a co-viewing invitation for co-viewing the target video within a playback progress range corresponding to the viewing progress range to the second viewers in response to determining that the second quantity is greater than or equal to a second threshold.

12. The method according to claim 1, wherein the method further comprises:

monitoring a third quantity of users viewing the target video;

determining a viewing progress of viewing the target video by each of the users in response to determining that the third quantity is greater than or equal to a third threshold;

determining at least one target projection room associated with the target video based on the viewing progress of each of the users; and sending each of the users a video co-viewing invitation to access a corresponding target projection room based on the viewing progress of each of the users, wherein the corresponding target projection room is among the at least one target projection room associated with the target video.

13. The method according to claim 12, wherein after the determining a viewing progress of viewing the target video by each of the users, the method further comprises:

dividing the target video into at least one progress interval based on a preset duration; and sending a co-viewing invitation for co-viewing the target video in a same progress interval among the at least one progress interval to a user whose viewing progress falls within the same progress interval.

14. The method according to claim 1, wherein the method further comprises:

receiving an instruction indicative of accepting the video viewing invitation submitted by the user; and adding the user to the target projection room in response to receiving the instruction.

15. A computing device, comprising a memory, a processor, and computer instructions stored in the memory and executable by the processor, wherein the computer instructions upon execution by the processor cause the processor to implement operations comprising:

determining a viewing progress of viewing a target video, wherein the determining a viewing progress of viewing a target video comprises:

receiving a progress adjustment instruction with respect to the target video, wherein the progress adjustment instruction carries a target viewing progress, and when a difference between the target viewing progress and a current viewing progress is greater than a preset adjustment threshold, determining the target viewing progress as the viewing progress, or when a playback duration of the target video that starts playing from the target viewing progress satisfies a preset playback duration, determining a sum of the target viewing progress and the preset playback duration as the viewing progress;

determining a target projection room associated with the target video based on the viewing progress; and sending a video co-viewing invitation to access the target projection room, wherein the target projection room comprises a control configured to perform message communications among viewers, and wherein the target projection room further comprises an area of displaying messages.

16. The computing device according to claim 15, the operations further comprising:

determining whether there exists a projection room playing the target video or an associated video that is associated with the target video;

determining a first quantity of first viewers who are viewing the target video or the associated video in response to determining that the projection room playing the target video or the associated video does not exist;

sending a co-viewing invitation for co-viewing the target video or the associated video to the first viewers in response to determining that the first quantity is greater than or equal to a first threshold; and creating the target projection room in response to receiving an instruction indicative of accepting the co-viewing invitation returned by a first target user among the first viewers.

17. The computing device according to claim 15, the operations further comprising:

determining, based on the viewing progress, whether there exists the target projection room associated with the target video;

determining a viewing progress range based on the viewing progress in response to determining that there does not exist the target projection room associated with the target video;

monitoring a second quantity of second viewers whose viewing progresses of viewing the target video are within the viewing progress range; and sending a co-viewing invitation for co-viewing the target video within a playback progress range corresponding to the viewing progress range to the second viewers in response to determining that the second quantity is greater than or equal to a second threshold.

18. The computing device according to claim 15, the operations further comprising:

monitoring a third quantity of users viewing the target video;

determining a viewing progress of viewing the target video by each of the users in response to determining that the third quantity is greater than or equal to a third threshold;

determining at least one target projection room associated with the target video based on the viewing progress of each of the users; and sending each of the users a video co-viewing invitation to access a corresponding target projection room based on the viewing progress of each of the users, wherein the corresponding target projection room is among the at least one target projection room associated with the target video.

19. A non-transitory computer-readable storage medium, storing computer instructions, wherein the computer instructions upon execution by a processor cause the processor to implement operations comprising:

determining a viewing progress of viewing a target video, wherein the determining a viewing progress of viewing a target video comprises:

receiving a progress adjustment instruction with respect to the target video, wherein the progress adjustment instruction carries a target viewing progress, and when a difference between the target viewing progress and a current viewing progress is greater than a preset adjustment threshold, determining the target viewing progress as the viewing progress, or when a playback duration of the target video that starts playing from the target viewing progress satisfies a preset playback duration, determining a sum of the target viewing progress and the preset playback duration as the viewing progress;

determining a target projection room associated with the target video based on the viewing progress; and sending a video co-viewing invitation to access the target projection room, wherein the target projection room comprises a control configured to perform message communications among viewers, and wherein the target projection room further comprises an area of displaying messages.

20. The non-transitory computer-readable storage medium of claim 19, the operations further comprising:

determining whether there exists a projection room playing the target video or an associated video that is associated with the target video;

determining a first quantity of first viewers who are viewing the target video or the associated video in response to determining that the projection room playing the target video or the associated video does not exist;

sending a co-viewing invitation for co-viewing the target video or the associated video to the first viewers in response to determining that the first quantity is greater than or equal to a first threshold; and creating the target projection room in response to receiving an instruction indicative of accepting the co-viewing invitation returned by a first target user among the first viewers.

* * * * *